(12) United States Patent
Tatsuta et al.

(10) Patent No.: US 11,878,247 B2
(45) Date of Patent: Jan. 23, 2024

(54) COMPUTER-READABLE NON-TRANSITORY STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventors: Hideyuki Tatsuta, Kyoto (JP);
Takafumi Masaoka, Kyoto (JP);
Kazuhiro Yoshikawa, Kyoto (JP);
Ryosuke Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/850,314

(22) Filed: Jun. 27, 2022

(65) Prior Publication Data
US 2023/0256337 A1    Aug. 17, 2023

(30) Foreign Application Priority Data

Feb. 16, 2022 (JP) .................................. 2022-022410

(51) Int. Cl.
*A63F 13/56* (2014.01)
*A63F 13/573* (2014.01)
*A63F 13/812* (2014.01)

(52) U.S. Cl.
CPC ............ *A63F 13/56* (2014.09); *A63F 13/573* (2014.09); *A63F 13/812* (2014.09);
(Continued)

(58) Field of Classification Search
CPC ....... A63F 13/56; A63F 13/573; A63F 13/812; A63F 2300/646; A63F 2300/6607; A63F 2300/8011
See application file for complete search history.

(56) References Cited

U.S. PATENT DOCUMENTS 8,578,302 B2 * 11/2013 Markovic ............... G06F 3/017
463/31
8,782,567 B2 * 7/2014 Latta ................... G06F 3/04883
345/157
(Continued)

FOREIGN PATENT DOCUMENTS

EP    3 406 307      11/2018
JP    2003-205173     7/2003
(Continued)

OTHER PUBLICATIONS

Jun. 21, 2023 Search Report issued in European Patent Application No. 23150082.8, p. 1-8.

*Primary Examiner* — David L Lewis
*Assistant Examiner* — Matthew D Hoel
(74) *Attorney, Agent, or Firm* — Nixon & Vanderhye PC

(57) ABSTRACT

In a virtual space of an own apparatus, the movement speed of a movement object is reduced on the basis of a reduction value according to a communication delay time with respect to an opponent apparatus. The reduction value is adjusted such that the movement speed of the movement object is reduced in accordance with the time having elapsed from start of movement of the movement object. The opponent character object is caused to perform an action on the movement object, on the basis of data received from the opponent apparatus.

20 Claims, 15 Drawing Sheets

(52) U.S. Cl.
CPC . *A63F 2300/646* (2013.01); *A63F 2300/6607* (2013.01); *A63F 2300/8011* (2013.01)

(56) References Cited

U.S. PATENT DOCUMENTS

| | | | | |
|---|---|---|---|---|
| 8,892,495 | B2* | 11/2014 | Hoffberg | F24F 11/62 |
| | | | | 706/48 |
| 8,894,490 | B2* | 11/2014 | Brandt | A63F 13/98 |
| | | | | 463/3 |
| 8,956,229 | B2* | 2/2015 | Suzuki | A63F 13/213 |
| | | | | 463/36 |
| 8,974,301 | B2* | 3/2015 | Suzuki | A63F 13/211 |
| | | | | 463/43 |
| 8,979,653 | B2* | 3/2015 | Suzuki | A63F 13/5375 |
| | | | | 463/36 |
| 9,211,475 | B2* | 12/2015 | Miyamoto | A63F 13/20 |
| 9,259,643 | B2* | 2/2016 | Lansdale | A63F 13/213 |
| 9,427,657 | B2* | 8/2016 | Suzuki | A63F 13/812 |
| 9,535,563 | B2* | 1/2017 | Hoffberg | H04N 5/782 |
| 10,471,347 | B2* | 11/2019 | Hinoshita | A63F 13/31 |
| 10,576,382 | B2* | 3/2020 | Onishi | A63F 13/80 |
| 11,110,348 | B2* | 9/2021 | Lalonde | A63F 13/352 |
| 11,140,207 | B2* | 10/2021 | Pennarun | H04L 43/50 |
| 11,305,186 | B2* | 4/2022 | Champy | A63F 13/335 |
| 11,369,873 | B2* | 6/2022 | Smullen | G09G 5/397 |
| 11,395,969 | B2* | 7/2022 | Terada | A63F 13/5375 |
| 11,433,311 | B2* | 9/2022 | Zimring | A63F 13/323 |
| 2010/0203969 | A1* | 8/2010 | Takahashi | A63F 13/428 |
| | | | | 463/32 |
| 2015/0109185 | A1* | 4/2015 | Shimamura | A63F 13/358 |
| | | | | 345/2.2 |
| 2018/0341335 | A1 | 11/2018 | Hinoshita et al. | |
| 2018/0341339 | A1 | 11/2018 | Ogura et al. | |
| 2023/0191253 | A1* | 6/2023 | Asai | A63F 13/803 |
| | | | | 463/31 |
| 2023/0241505 | A1* | 8/2023 | Melo | A63F 13/812 |
| | | | | 463/4 |
| 2023/0241506 | A1* | 8/2023 | Ikebata | A63F 13/58 |
| | | | | 463/31 |

FOREIGN PATENT DOCUMENTS

| | | |
|---|---|---|
| JP | 2015-082180 | 4/2015 |
| JP | 2018-168578 | 11/2018 |
| JP | 2018-196578 | 12/2018 |
| JP | 2019-136571 | 8/2019 |
| JP | 2020-146153 | 9/2020 |
| JP | 2022-161009 | 10/2022 |

* cited by examiner

COMPUTER-READABLE NON-TRANSITORY STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2022-22410 filed on Feb. 16, 2022, the entire contents of which are incorporated herein by reference.

FIELD

The present disclosure relates to information processing such as a sport game.

BACKGROUND AND SUMMARY

To date, game processing in which, while the game states of an own apparatus and an opponent apparatus are synchronized with each other, the position of an object is moved, has been known.

When synchronization of game states is performed as in the game processing described above, it is conceivable to adopt a method in which the movement speed of a movement object in an own apparatus is decreased in accordance with a communication delay time between the own apparatus and an opponent apparatus, thereby realizing synchronization between the own apparatus and the opponent apparatus. However, in such a case, a refreshing feeling at the time of moving the movement object may sometimes be impaired.

Therefore, an object of the exemplary embodiment is to provide: a computer-readable non-transitory storage medium having stored therein an information processing program that can, in a case where the movement speed of a movement object in an own apparatus is decreased to realize synchronization between the own apparatus and an opponent apparatus, prevent impairment of a refreshing feeling at the time of moving the movement object; an information processing system; an information processing apparatus; and an information processing method.

In order to attain the above object, for example, the following configuration examples are exemplified.

An example of configuration 1 is a computer-readable non-transitory storage medium having stored therein instructions that, when executed by a processor of a first information processing apparatus, cause the first information processing apparatus to perform operations including: transmitting/receiving data to/from a second information processing apparatus; arranging, in a virtual space, an own character object corresponding to a first user of the first information processing apparatus, an opponent character object corresponding to a second user of the second information processing apparatus, and a movement object; moving the movement object when a positional relationship condition regarding at least a positional relationship between the own character object and the movement object is satisfied; reducing a movement speed of the movement object on the basis of a first reduction value calculated on the basis of a delay time in communication, of the data, with the second information processing apparatus; adjusting the first reduction value such that the movement speed of the movement object is reduced in accordance with a time having elapsed from start of movement of the movement object; and causing the opponent character object to perform an action on the movement object, on the basis of data received from the second information processing apparatus.

According to the above configuration, when the first information processing apparatus and the second information processing apparatus are synchronized with each other with respect to a movement object, the movement speed of the movement object is reduced in accordance with the lapse of time. Therefore, the movement object can be moved so as not to impair a refreshing feeling at the time of moving the movement object.

In an example of configuration 2, in the example of the above configuration 1, the movement speed of the movement object may be reduced such that an amount of reduction of the movement speed of the movement object is increased in accordance with increase in the delay time.

According to the above configuration, the time for waiting for data, regarding the movement object, that is to be received from the second information processing apparatus can be ensured. Therefore, unnatural movement of the movement object can be prevented.

In an example of configuration 3, in the example of the above configuration 1, the movement object may be moved in an order of a first movement path and a second movement path; and the movement speed of the movement object moving along the second movement path may be reduced in accordance with a time having elapsed from start of movement of the movement object along the second movement path.

According to the above configuration, the time for waiting for data, regarding the movement object, that is to be received from the second information processing apparatus can be ensured. Therefore, unnatural movement of the movement object moving along the second movement path can be prevented.

In an example of configuration 4, in the example of the above configuration 3, the movement speed of the movement object may be reduced such that the movement speed decreases at the second movement path in accordance with a lapse of time and the movement object stops at a predetermined position on the second movement path.

According to the above configuration, the time for waiting for data, regarding the movement object, that is to be received from the second information processing apparatus can be ensured. Therefore, unnatural movement of the movement object moving along the second movement path can be prevented.

In an example of configuration 5, in the example of the above configuration 3, when data indicating that the movement object has ended moving along the second movement path in the virtual space of the second information processing apparatus has been received from the second information processing apparatus, a point in the game may be provided to the first user of the first information processing apparatus.

According to the above configuration, the time for waiting for data, regarding the movement object, that is to be received from the second information processing apparatus can be ensured. Therefore, it is possible to prevent unnatural movement in which, after a state where the movement object has ended moving along the second movement path and a point seems to have been provided has been established, a state where no point had been provided before the movement object has ended moving along the second movement path is established.

In an example of configuration 6, in the example of the above configuration 1, when an operation input of the first user satisfies a disadvantage condition, the movement speed of the movement object may be reduced on the basis of a second reduction value; and when the movement object has been moved on the basis of a movement speed having been reduced on the basis of the second reduction value, the second reduction value may be adjusted such that the movement speed is further reduced at a predetermined timing.

According to the above configuration example, the time for waiting for data, regarding the movement object, that is to be received from the second information processing apparatus can be ensured. Therefore, unnatural movement of the movement object when the disadvantage condition is satisfied can be prevented.

In an example of configuration 7, in the example of the above configuration 1, the first reduction value may be adjusted by increasing a reflection rate of the first reduction value in accordance with a time having elapsed from start of movement of the movement object, to reduce the movement speed of the movement object.

According to the above configuration example, the movement speed of the movement object can be reduced in accordance with the reflection rate.

According to the exemplary embodiment, it is possible to provide an information processing program, an information processing system, an information processing apparatus, and an information processing method which are capable of preventing impairment of a refreshing feeling at the time of moving the movement object when synchronization between the own apparatus and the opponent apparatus is realized by decreasing the movement speed of the movement object in the own apparatus.

These and other objects, features, aspects, and advantages of the exemplary embodiment will become more apparent from the following detailed description of non-limiting example embodiments when taken in conjunction with the accompanying drawings.

DETAILED DESCRIPTION OF NON-LIMITING EXAMPLE EMBODIMENTS

Hereinafter, one exemplary embodiment will be described.

[Hardware Configuration Of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. The information processing according to the exemplary embodiment can also be applied to a game system including a game apparatus, etc., as described above, and a predetermined server. In the exemplary embodiment, a stationary game apparatus (which may be referred to as a "game apparatus") will be described as an example of the information processing apparatus.

Figure 1:
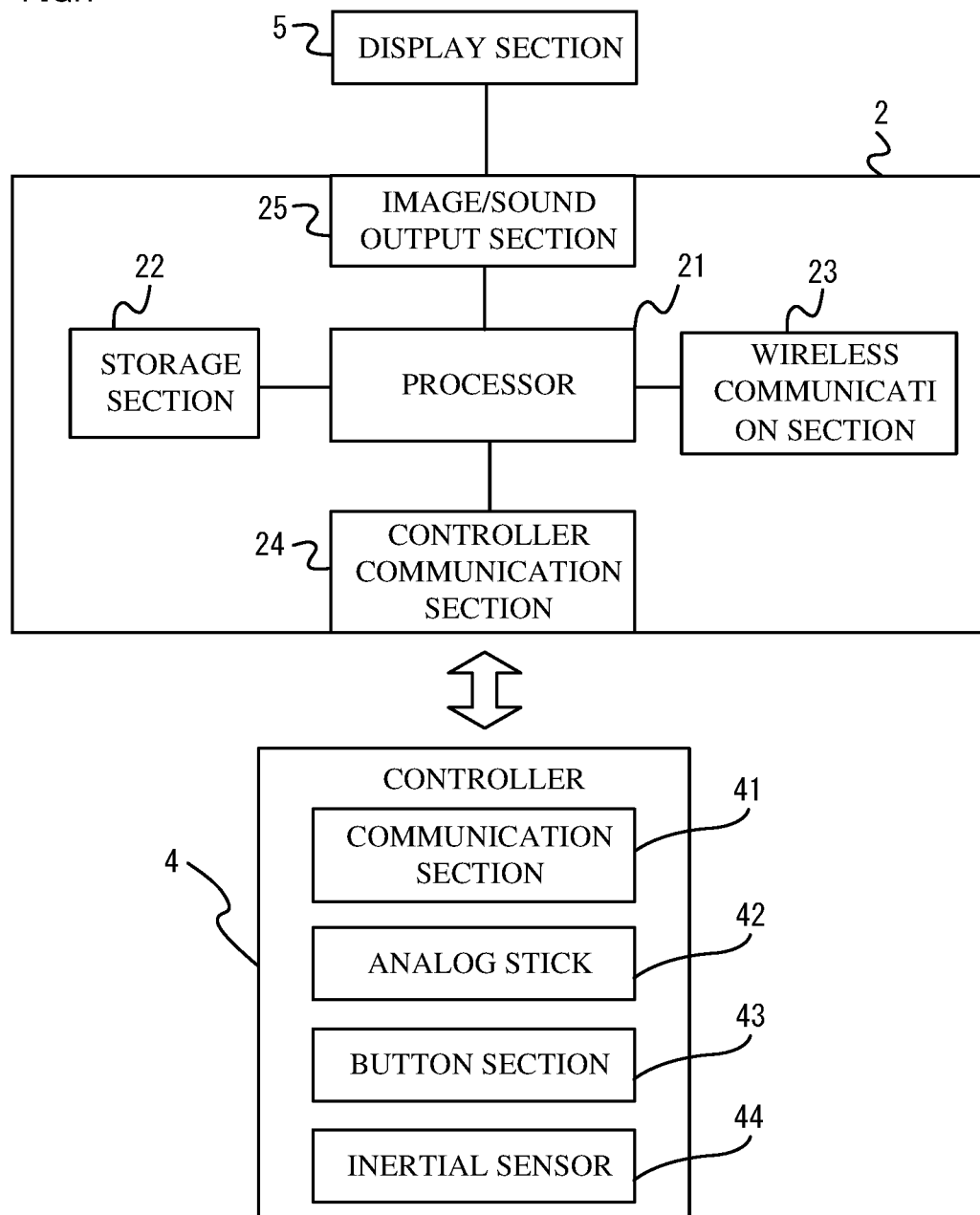
FIG. 1 is a block diagram showing a non-limiting example of an internal configuration or the like of a game apparatus 2.

FIG. 1 is a block diagram showing an example of the internal configuration, etc., of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs various types of information processing by executing an information processing program (e.g., a game program) stored in a storage section 22. The storage section 22 may be, for example, an internal storage medium such as a flash memory or a DRAM (Dynamic Random Access Memory), or may be configured to utilize an external storage medium mounted to a slot that is not shown, or the like.

The game apparatus 2 includes a wireless communication section 23 which allows the game apparatus 2 to perform wireless communication with another game apparatus 2 or a predetermined server apparatus. As the wireless communication, for example, Internet communication or short-range wireless communication is used.

The game apparatus 2 includes a controller communication section 24 which allows the game apparatus 2 to perform wired or wireless communication with a controller 4.

A display section 5 (e.g., a television) is connected to the game apparatus 2 via an image/sound output section 25. The processor 21 outputs images or sounds generated (by executing the aforementioned information processing, for example), to the display section 5 via the image/sound output section 25.

Next, the controller 4 will be described. The controller 4 includes at least one analog stick 42 being an example of a direction input device. The analog stick 42 can be used as a direction input section capable of inputting a direction. By tilting the analog stick 42, a user (player) can input a direction corresponding to the direction of the tilt (and an input having a magnitude corresponding to the angle of the tilt). The controller 4 includes a button section 43 including various operation buttons. For example, the controller 4 may include a plurality of operation buttons (e.g., an A button, a B button, an X button, and a Y button) on the main surface of the housing of the controller 4.

The controller 4 includes an inertial sensor 44. Specifically, the controller 4 includes an acceleration sensor and an angular velocity sensor, as the inertial sensor 44. In the exemplary embodiment, the acceleration sensor detects the magnitudes of accelerations along predetermined three-axis directions. The angular velocity sensor detects angular velocities around the predetermined three axes.

The controller 4 includes a communication section 41 for performing wired or wireless communication with the controller communication section 24. The content of a direction input to the analog stick 42, information indicating the press state of the button section 43, and various detection results by the inertial sensor 44 are repeatedly outputted to the communication section 41 at appropriate timings, to be transmitted to the game apparatus 2.

[Game assumed in the exemplary embodiment]

Figure 2:
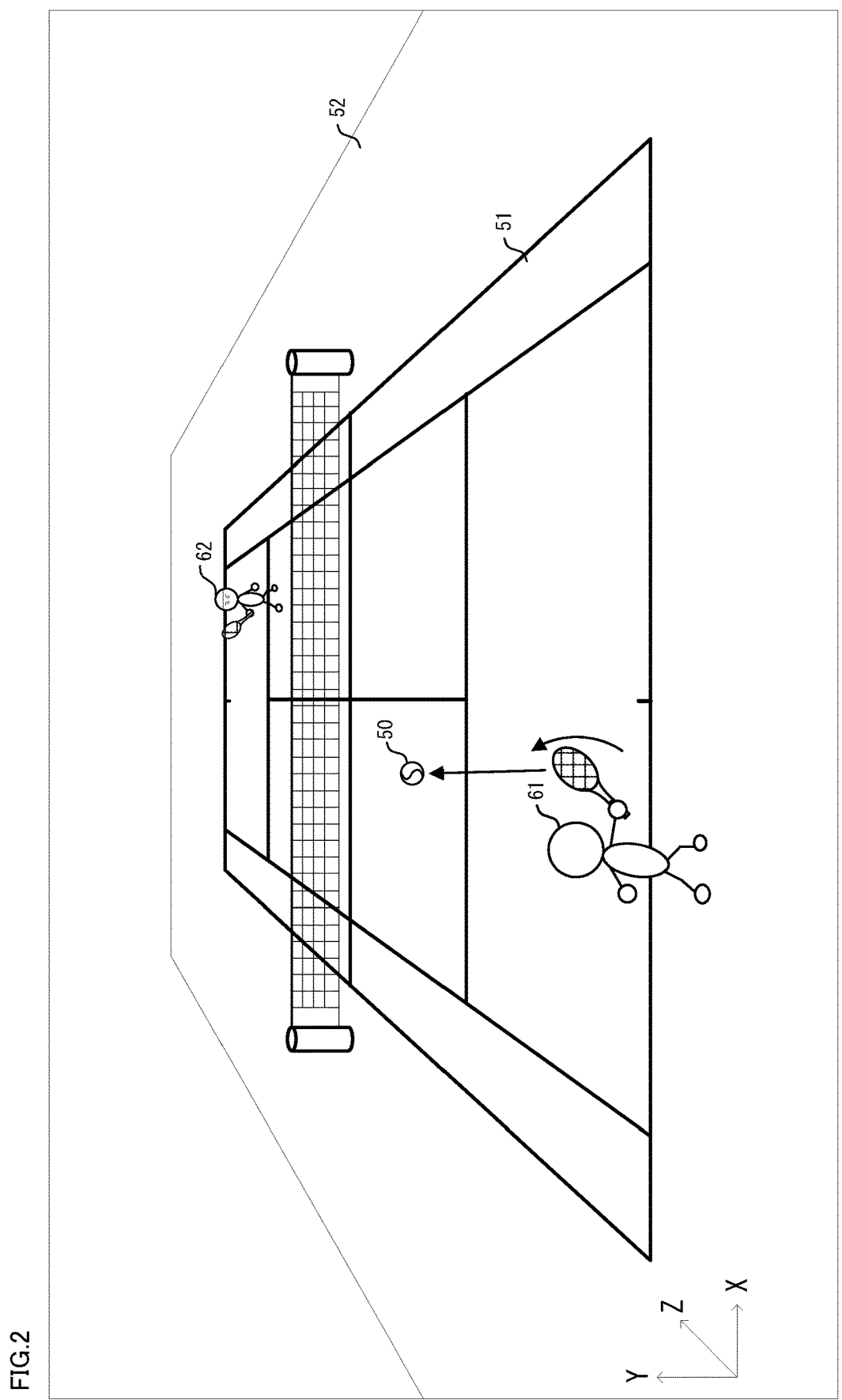
FIG. 2 is a diagram for describing a non-limiting example of the outline of this game.

Next, the outline of game processing (an example of information processing) executed by the game apparatus 2 according to the exemplary embodiment will be described. First, as shown in FIG. 2, the game assumed in the exemplary embodiment is a tennis game of which the concept is singles tennis, as an example. Specifically, in this game, two athlete character objects (which each may be referred to as a "character") being virtual human-type objects are respectively arranged, one for each, in the own-side court and the opponent-side court of a tennis court prepared in a virtual space, and a tennis game is performed.

This game can be played by two users via a network such as the Internet, or via short-range wireless communication or the like. In the exemplary embodiment, a case in which one user is in charge of one character and performs operation, is assumed. When there is no opponent user, the opponent character automatically performs motion according to a computer.

[Outline of game processing of the exemplary embodiment]

Next, the outline of the game processing executed by the game apparatus 2 according to the exemplary embodiment will be described. As shown in FIG. 2, in this game, a portion of a ground object arranged in the virtual space serves as a tennis court 51, and an outer-peripheral court area 52 is provided as a ground area around the tennis court 51. In the tennis court 51 (and the outer-peripheral court area 52), a character object (which may be referred to as an "own character") 61 operated by the user is arranged in the own-side court, and a character object (which may be referred to as a "opponent character") 62 of the opponent is arranged in the opponent-side court. A ball object (movement object; which may be referred to as a "ball") 50 is hit with tennis rackets by the own character 61 and the opponent character 62, whereby the tennis game proceeds. In this game, each character (the own character 61, the opponent character 62) is automatically moved by a computer to a position (a position that satisfies a predetermined positional relationship in which the character can hit the ball) at which the ball 50 is to hit, and the user (player) operates a predetermined operation button at an appropriate timing (e.g., a timing within a period in which the positional relationship is satisfied) to cause the character to perform a motion of swinging a tennis racket, thereby being able to hit the tennis ball. The character may be caused to perform a motion of swinging a tennis racket not through an operation of an operation button but through an operation of swinging the controller 4, thereby hitting the tennis ball.

A virtual camera disposed in the virtual space captures an image, while locking down from above and behind the own character 61, such that an area including the tennis court 51 and the outer-peripheral court area 52 are included in the imaging range, thereby generating a game image as shown in FIG. 2. The virtual camera moves in the left-right direction in accordance with movement (movement in the X-axis direction) in the left-right direction of the player character 61, to capture the virtual space from above and behind the player character 61.

Figure 3:
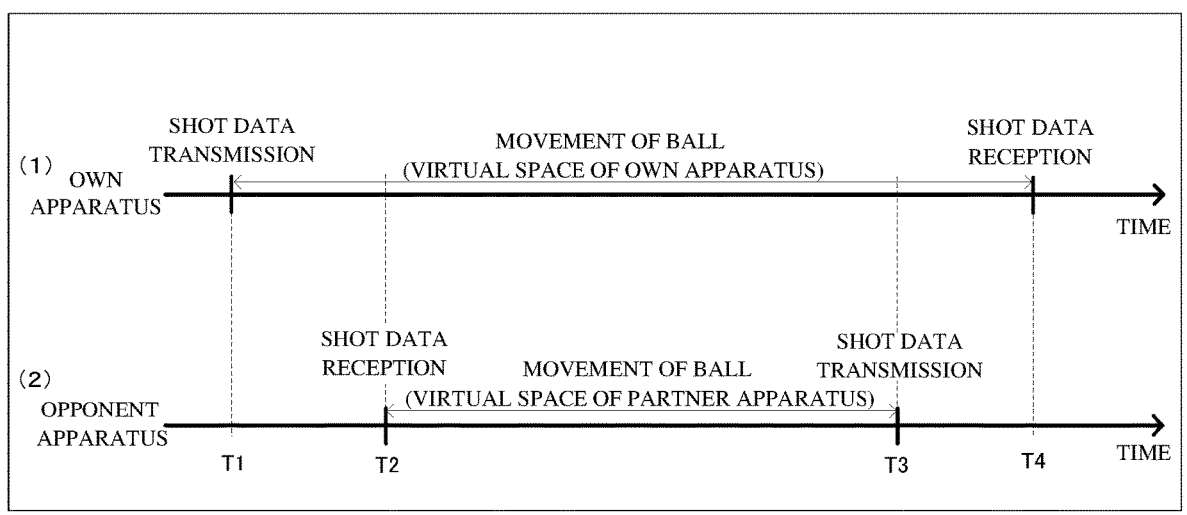
FIG. 3 is a diagram for describing a non-limiting example of communication delay and the like when an own character has hit a shot.

FIG. 3 is a communication timing chart for describing communication delay between the game apparatus 2 (which may be referred to as an "own apparatus") operated by the user and the game apparatus 2 (which may be referred to as a "opponent apparatus") operated by the opponent user. In the following, with reference to FIG. 3, a case where the own character 61 hits a shot toward the opponent-side court through an operation of the user at the own apparatus, and the opponent character 62 hits back the shot toward the own-side court through an operation by the opponent user at the opponent apparatus, is described.

First, as shown in FIG. 3, at T1, when the own character 61 has hit a shot toward the opponent-side court in the virtual space (game space) of the own apparatus, movement of the ball 50 is started in the virtual space of the own apparatus, and shot data indicating that the own character 61 has hit a shot is transmitted to the opponent apparatus. Here, in such a case where the communication is performed via the Internet, a round-trip time (which may be referred to as an "RTT") in the communication between the own apparatus and the opponent apparatus may occur and the round-trip time may be prolonged. Therefore, as shown in FIG. 3, the shot data transmitted from the own apparatus at T1 is received by the opponent apparatus at T2, and movement of the ball 50 is started in the virtual space (game space) of the opponent apparatus. Then, at T3, when the opponent character 62 (an own character 61 for the opponent apparatus) has hit back the ball 50 through an operation by the opponent user in the virtual space of the opponent apparatus, shot data indicating that the opponent character 62 has hit a shot is transmitted to the own apparatus. Then due to influence of the RTT, the shot data transmitted from the opponent apparatus is received by the own apparatus at T4.

Figure 4:
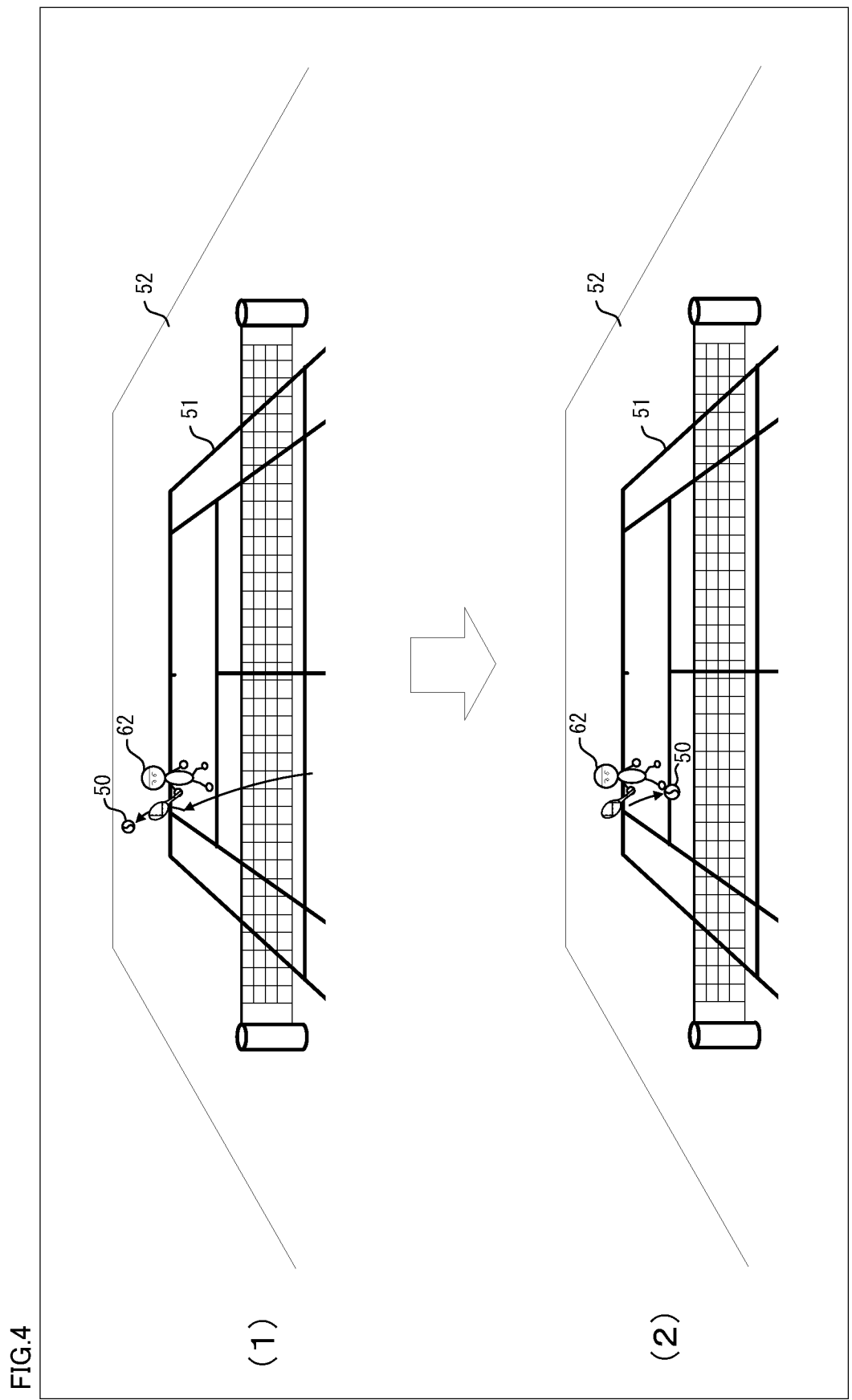
FIG. 4 is a diagram for describing a non-limiting example of a tennis game image.

Here, as shown in FIG. 3, the time (the period from T1 to T4) in which the ball 50 moves in the virtual space of the own apparatus is longer than the time (the period from T2 to T3) in which the ball 50 moves in the virtual space of the opponent apparatus. Therefore, when the movement speed of the ball 50 in the virtual space of the own apparatus and the movement speed of the ball 50 in the virtual space of the opponent apparatus are the same, unnatural display (display giving a strange feeling) may be performed in the game image in the own apparatus. FIG. 4 is a diagram for describing display of an unnatural game image that could be caused in the own apparatus in such a case.

First, as shown in (1) of FIG. 4, since the movement speed of the ball 50 is the same as the movement speed of the ball 50 in the virtual space of the opponent apparatus, display in which the ball 50 has passed through the position of the opponent character 62 and the opponent character 62 has failed to hit back the shot is performed in the virtual space (game image) of the own apparatus. Then, at T3 in FIG. 3, the ball 50 is hit back by the opponent character 62. Then, in the virtual space (game image) of the own apparatus, as shown in (2) of FIG. 4, the opponent character 62, which should not have been able to hit back, hits back the shot in some cases.

Therefore, in this game processing, in the virtual space (game image) of the own apparatus, a speed reduction rate of the movement speed of the ball 50 is determined in accordance with the length of the RTT. Then, the movement speed of the shot ball 50 is adjusted gradually (smoothly) in accordance with a lapse of time such that the speed indicated by the speed reduction rate is attained.

Figure 5:
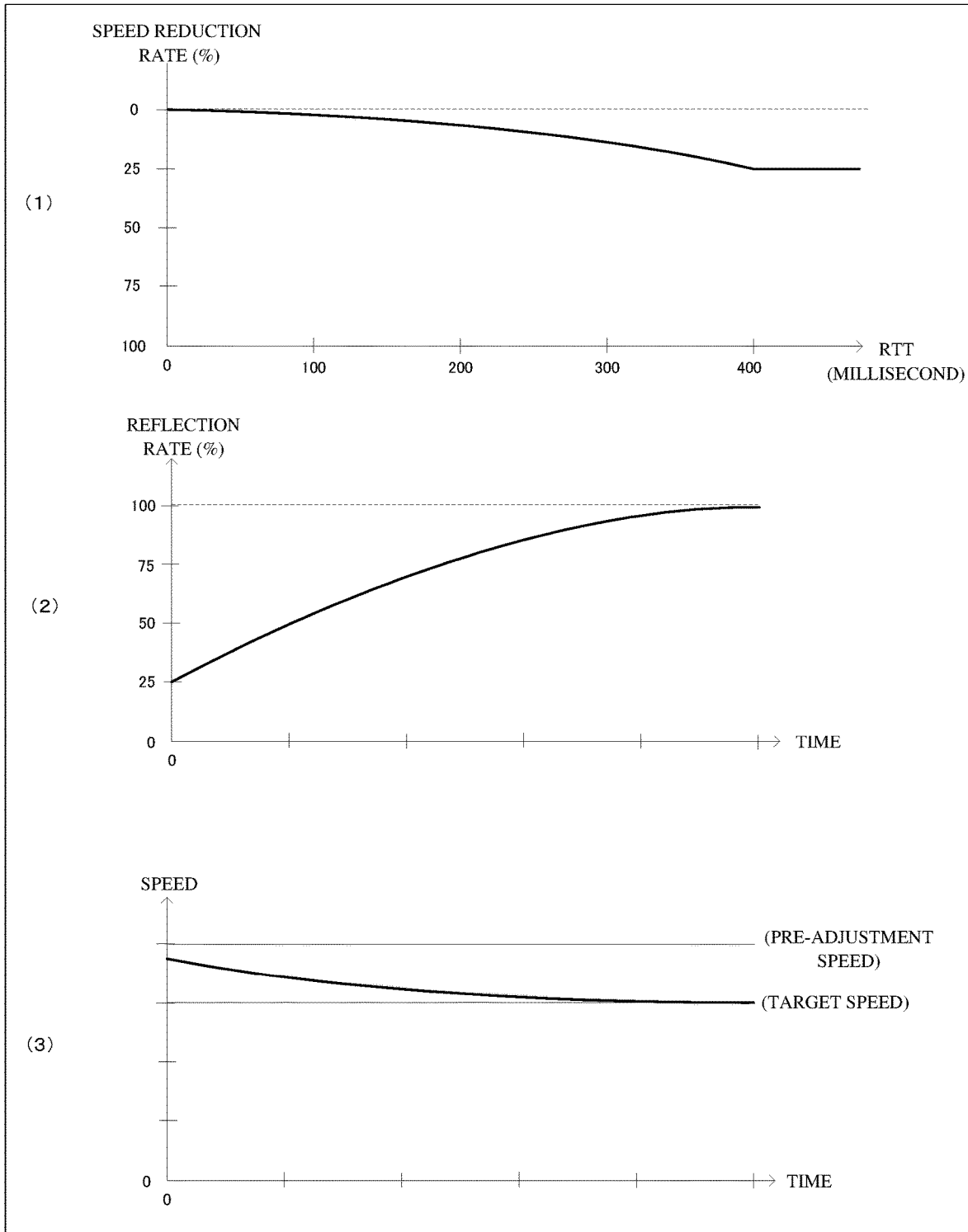
FIG. 5 is a diagram for describing a non-limiting example of movement speed adjustment of a ball shot by the own character.

(1) of FIG. 5 is an example of a graph showing a relationship between the length of the RTT measured at the time point of a shot and the speed reduction rate of the movement speed of the ball 50 shot (ordinary shot, smash, lob, etc.) by the own character 61. As indicated by a solid line in (1) of FIG. 5, in accordance with increase in the RTT, the speed reduction rate of the movement speed of the shot ball 50 increases (in a smooth curve), and at not less than 400 milliseconds of the RTT, the speed reduction rate becomes constant and does not increase any more. For example, when the RTT is 400 milliseconds, the above speed reduction rate is determined to be 25%, and in this case, the movement speed of the shot ball 50 is eventually reduced by 25%. The above speed reduction rate may be referred to as a "first reduction value". The movement speed of the ball 50 attained by the above speed reduction rate may be referred to as a "target speed". In this game processing, when the RTT is not less than a predetermined value, it is determined that the match should be suspended because the communication environment is bad, and the match is suspended.

In this game processing, a reflection rate of reflecting the speed reduction rate is gradually (smoothly) increased in accordance with a lapse of time such that the movement speed of the ball 50 gradually (smoothly) reaches the speed (target speed) indicated by the above speed reduction rate. (2) of FIG. 5 is an example of a graph indicating a relationship between the above reflection rate and the lapse of time. As indicated by a solid line in (2) of FIG. 5, the reflection rate is 25% at the time point of time 0, then, gradually (smoothly) increases from 25% in accordance with the lapse of time, and eventually becomes 100%. In this game processing, as an example, the time (reflection completion time) in which the reflection rate reaches 100% is 500 milliseconds. (3) of FIG. 5 is a graph showing an example in which adjustment (speed reduction) is performed such that the reflection rate gradually increases in accordance with the lapse of time, thereby allowing the movement speed of the shot ball 50 to gradually reach the speed (target speed) indicated by the speed reduction rate. As indicated by a solid line in (3) of FIG. 5, the movement speed of the shot ball 50 is reduced by 25% immediately after the shot, and then, with the reflection rate gradually (smoothly) increasing in accordance with the lapse of time (see (2) of FIG. 5), the movement speed of the shot ball 50 eventually becomes a movement speed (target speed) indicated by the speed reduction rate. In this game processing, as an example, the time until the movement speed of the shot ball 50 is caused to reach the target speed is 500 milliseconds.

Figure 6:
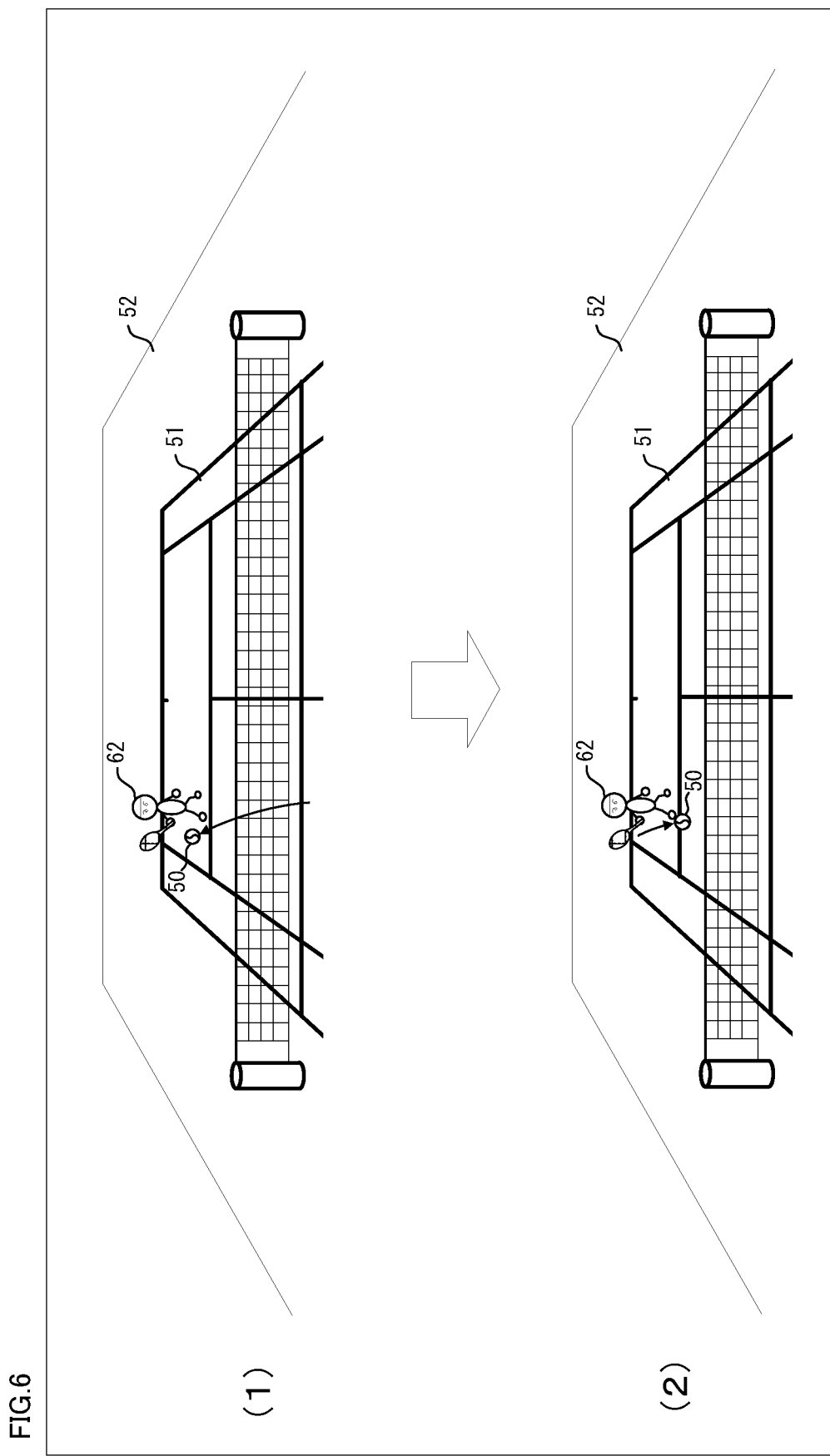
FIG. 6 is a diagram for describing a non-limiting example of a tennis game image.

FIG. 6 is a diagram for describing display of a game image of the own apparatus when the above-described processing is performed. As shown in FIG. 6, in the virtual space (game image) of the own apparatus, as a result of reduction of the speed of the ball 50, the opponent character 62 hits back (see (2) of FIG. 6) the shot before the ball 50 passes through (see (1) of FIG. 6) the position of the opponent character 62. Therefore, display of an unnatural game image (giving a strange feeling) described with reference to FIG. 4 can be prevented from being performed.

In this game processing, as described with reference to FIG. 5, the movement speed of the shot ball 50 is reduced to some extent immediately after the shot, then, is gradually (smoothly) reduced, and then eventually becomes a movement speed indicated by the speed reduction rate. That is, the movement speed of the shot ball 50 is not reduced to a large extent at first, and then is gradually reduced more in accordance with the lapse of time. Therefore, according to this game processing, while display of an unnatural game image due to communication delay is prevented from being performed, a refreshing feeling of the user at the time when the own character 61 has hit a shot can be ensured.

Next, a case where the shot hit by the own character 61 bounces for a first time in the opponent-side court and then bounces for a second time inside the opponent-side court or outside the opponent-side court, will be described. Similar to regular tennis, in this game processing as well, when a shot hit by the own character 61 has bounced for the first time inside the opponent-side court, and then has bounced for the second time inside the opponent-side court or outside the opponent-side court, a point is provided to the own character 61 side. Here, when the RTT is relatively long as described with reference to FIG. 3, unnatural display as below may be performed. That is, as shown in (1) of FIG. 7, in the virtual space (game image) of the own apparatus, after the ball 50 hit by the own character 61 has bounced for the second time and the opponent character 62 has failed to hit back the shot, the ball 50 is hit back (see T3 of FIG. 3) by the opponent character 62, and then, in the virtual space (game image) of the own apparatus, the opponent character 62 hits back the shot as shown in (2) of FIG. 7. That is, in some cases, unnatural display may be performed such that, after display in which the ball 50 hit by the own character 61 has bounced for the second time and a point seems to have been obtained, is performed, the opponent character 62 hits back the shot before the second bounce is made.

Figure 8:
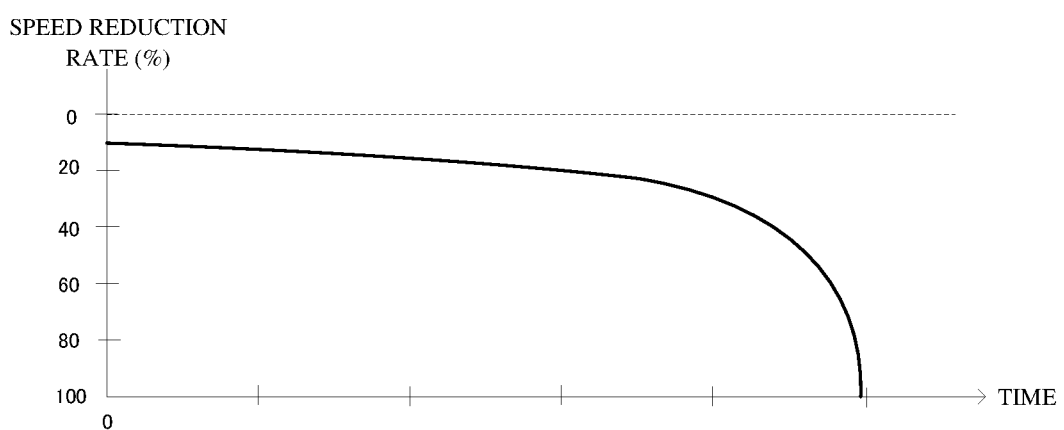
FIG. 8 is a diagram for describing a non-limiting example of movement speed adjustment between the first bounce of a ball shot by the own character and the second bounce thereof.

Therefore, in this game processing, in the virtual space (game image) of the own apparatus, the movement speed of the ball 50 is adjusted in a period after the first bounce of the shot hit by the own character 61. FIG. 8 is an example of a graph showing a relationship between the speed reduction rate of the movement speed of the ball 50 and the lapse of time, in a period after the first bounce of a shot hit by the own character 61 in the virtual space (game image) of the own apparatus. It should be noted that speed adjustment (speed reduction process) of the ball 50 described below with reference to FIG. 8 is executed with respect to the speed after the speed adjustment (speed reduction process) of the shot described with reference to FIG. 5 has been executed. The movement path of the ball 50 from hitting of a shot performed by the own character 61 to the first bouncing may be referred to as a "first movement path", and the movement path of the ball 50 from the first bounce to the second bounce may be referred to as a "second movement path".

As indicated by a solid line in FIG. 8, the speed reduction rate of the ball 50 becomes 10% at the time point of the first bounce corresponding to the time point of time 0 in the graph, and then gently increases in accordance with the lapse of time. Then, as shown in FIG. 8, the speed reduction rate of the ball 50 rapidly increases and eventually becomes 100% (i.e., the movement speed becomes 0), and the ball 50 stops at the end position of the second movement path.

Here, after the own character 61 has hit a shot, information ("shot data" indicated at T3 in FIG. 3) indicating that the opponent character 62 has hit back the shot or information (which may be referred to as "return failure data") indicating that the opponent character 62 has failed to hit back the shot is transmitted from the opponent apparatus to the own apparatus. Upon receiving the above shot data transmitted from the opponent apparatus, the own apparatus performs display of a motion (action) of the opponent character 62 hitting back the shot in the virtual space (game image) of the own apparatus, and performs display of the ball 50 that has been hit back. When the own apparatus has received the above return failure data transmitted from the opponent apparatus, the own apparatus performs display in which the opponent character 62 has failed to hit back the shot and the ball 50 having been moving at a reduced speed or the ball 50 having been stopped moves in the depth direction (the Z-axis direction in FIG. 2) in the virtual space (game image) of the own apparatus. In this case, the own apparatus ends the speed adjustment of the ball 50 shown in FIG. 8 and performs movement control on the ball 50 at a reference speed.

Figure 9:
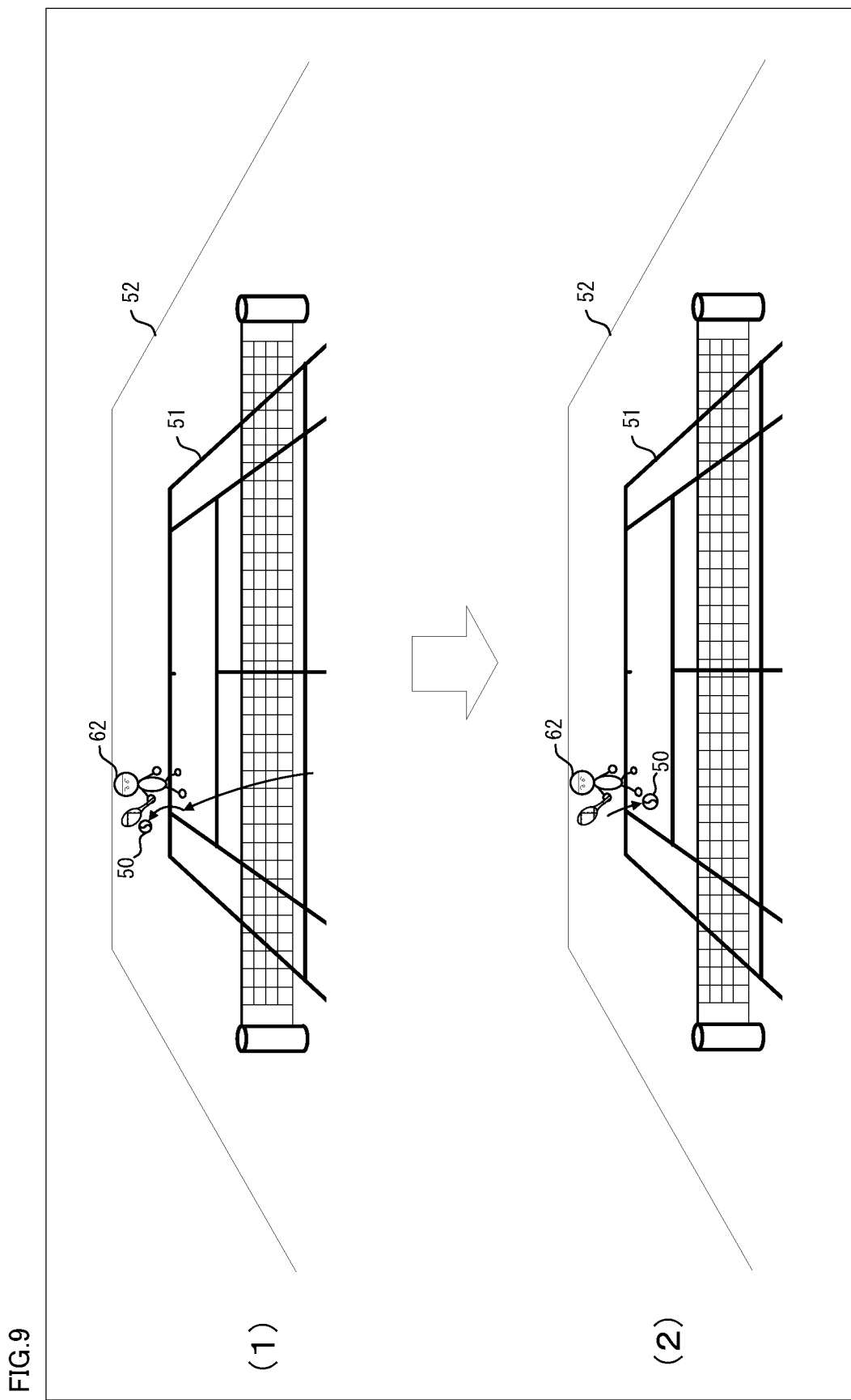
FIG. 9 is a diagram for describing a non-limiting example of a tennis game image.

FIG. 9 is a diagram for describing display of a game image of the own apparatus when the above-described process is performed. As shown in (1) of FIG. 9, in this game processing, in the virtual space (game image) of the own apparatus, the speed of the ball 50 is gently reduced after the first bounce and then rapidly reduced, and when it takes too much time (i.e., when a predetermined time has elapsed) before receiving shot data or return failure data, the ball 50 is stopped. Then, when the opponent character 62 has hit back the shot, display of the opponent character 62 hitting back the shot is performed in the virtual space (game image) of the own apparatus as shown in (2) of FIG. 9. Thus, according to this game processing, display of an unnatural game image (giving a strange feeling) as described with reference to FIG. 7 can be prevented from being performed.

Next, a case where the own character 61 has hit a miss shot will be described. In this game processing, when the user has operated a predetermined button at a predetermined timing (e.g., a timing within predetermined 0.2 seconds (which may be referred to as a "shot success timing")), the own character 61 succeeds in hitting a shot. Meanwhile, when the user has operated a predetermined button at a predetermined timing (e.g., a timing within 0.1 seconds provided for each of before and after the shot success timing; which may be referred to as a "miss shot timing") before and after the shot success timing, the own character 61 hits a miss shot (the ball 50 in a miss shot state) toward the opponent-side court. A condition in which the above-described miss shot is hit may be referred to as a "disadvantage condition".

A miss shot attribute indicating that the shot is a miss shot is added to the ball 50 in the miss shot state, and in accordance therewith, an effect image indicating that the shot is a miss shot is added to the ball 50. The opponent character 62 can hit back a smash by hitting back the ball 50 (the ball 50 to which the miss shot attribute has been added) in the miss shot state. The ball 50 in such a miss shot state moves in an arch-shaped trajectory, and when the falling-down ball 50 reaches a certain height or lower, the added miss shot attribute is canceled and the display of the added effect image is not displayed any more, whereby the miss shot state is eliminated.

In a case where the movement speed of the ball 50 in the miss shot state is not adjusted, there are cases where an unnatural game image is displayed. That is, in the virtual space (game image) of the own apparatus, although the miss shot attribute has been canceled and the miss shot state has been eliminated, the opponent character 62 of the opponent apparatus hits back a smash because data reception (reception of shot data) from the opponent apparatus is delayed.

Figure 10:
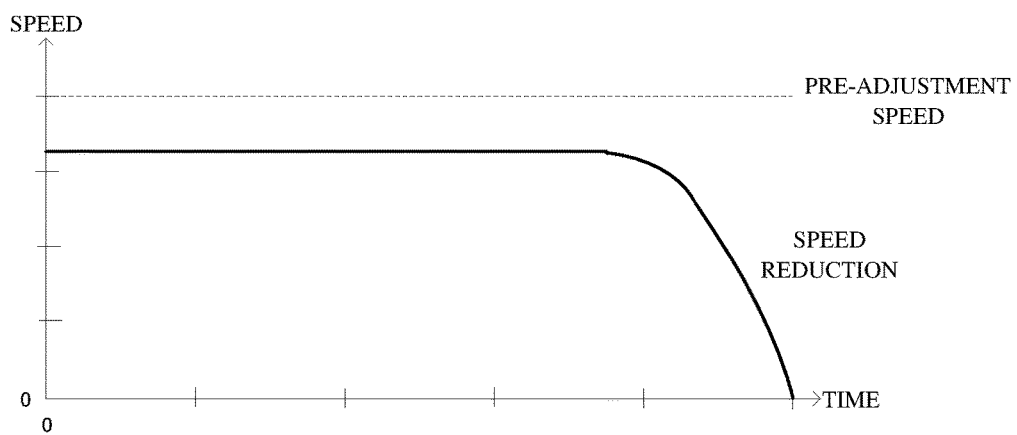
FIG. 10 is a diagram for describing a non-limiting example of movement speed adjustment of a miss shot of a ball by the own character.

Therefore, in this game processing, in the virtual space (game image) of the own apparatus, the movement speed of the ball 50 of a miss shot hit by the own character 61 is adjusted. FIG. 10 is an example of a graph showing a relationship between the lapse of time and the movement speed of the ball 50 of a miss shot hit by the own character 61 in the virtual space (game image) of the own apparatus. As shown in FIG. 10, the movement speed of the ball 50 decreases by a constant rate with respect to a pre-adjustment speed from the time point of hitting a miss shot, and then, rapidly decreases at a predetermined timing (e.g., a predetermined timing at which the miss shot ball 50 falls down and reaches a position of a predetermined height (e.g., 1 meter) from the ground) after a lapse of a predetermined time. That is, the movement speed of the ball 50 is adjusted on the basis of a predetermined reduction value (which may be referred to as a "second reduction value"). Then, as shown in FIG. 10, the movement speed of the ball 50 eventually becomes 0, and the ball 50 stops.

Therefore, according to this game processing, in the virtual space (game image) of the own apparatus, a state (miss shot state) in which a miss shot attribute has been added is continued for a long time. Thus, enough time until receiving data indicating that the opponent character 62 has hit a smash can be ensured, and display of the above-described unnatural game image (giving a strange feeling) can be prevented from being performed.

Next, in a case where the own character 61 has hit a shot, a process of adjusting the position of the opponent character 62 in the virtual space (game image) of the own apparatus will be described. As described with reference to FIG. 5 and the like, unnatural display due to communication delay (RTT) can be basically prevented from being performed, through speed adjustment of the ball 50 in the virtual space (game image) of the own apparatus. However, when the RTT is prolonged to some extent, unnatural display (see FIG. 4) cannot be prevented from being performed, merely by speed adjustment of the ball 50 in some cases. Therefore, in this game processing, when the length of the RTT has become not less than a predetermined length, a process of shifting, in accordance with the length of the RTT, the position of the opponent character 62 from the original position thereof in the advancement direction of the ball 50 in the virtual space (game image) of the own apparatus, is performed. In the following, specific description is given with reference to FIG. 11 and FIG. 12.

Figure 11:
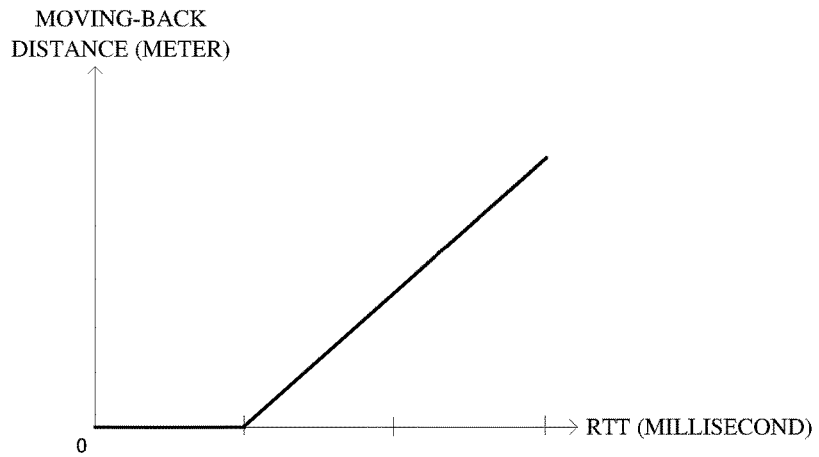
FIG. 11 is a diagram for describing a non-limiting example of position adjustment of an opponent character when the own character has hit a shot.
Figure 12:
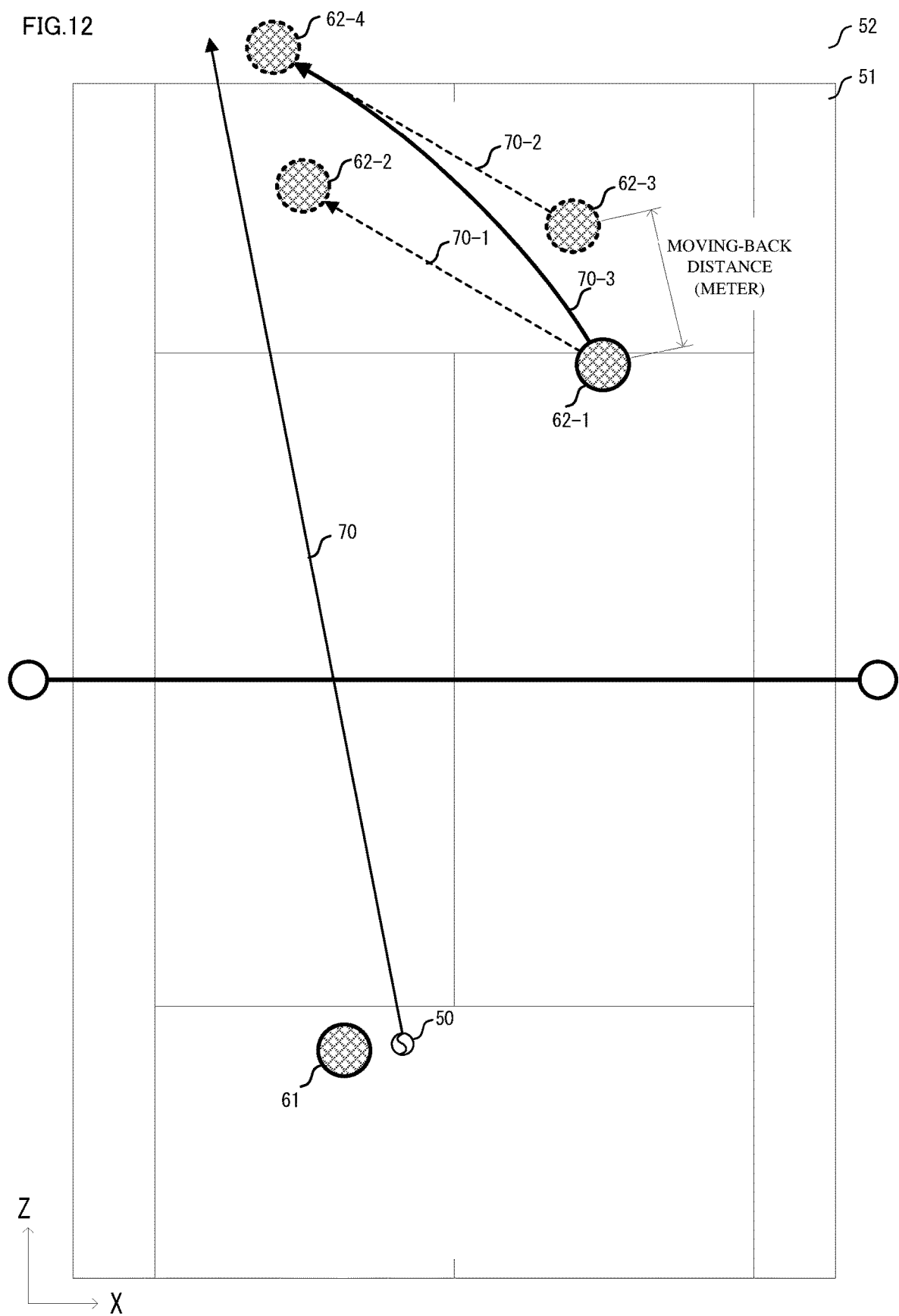
FIG. 12 is a diagram for describing a non-limiting example of position adjustment of the opponent character when the own character has hit a shot.

FIG. 11 is a graph showing a relationship between the length of the RTT measured at the time point of the own character 61 hitting a shot, and the distance (which may be referred to as a "moving-back distance") by which the position of the opponent character 62 is shifted from the original position thereof in the advancement direction of the ball 50 in the virtual space (game image) of the own apparatus. FIG. 12 shows a tennis court 52 viewed from above in the virtual space (see FIG. 2) of the own apparatus, and is a diagram for describing position adjustment of the opponent character 62. In FIG. 12, the own character 61 and the opponent character 62 are each represented by a circular shape.

As shown in FIG. 11, in this game processing, when the RTT at the time point of the own character 61 hitting a shot has become not less than a predetermined value, the opponent character 62 is moved back from the original position thereof in the advancement direction of the ball 50 in the virtual space (game image) of the own apparatus, in accordance with the length of the RTT. As shown in FIG. 11, the moving-back distance of the opponent character 62 increases in accordance with increase in the RTT.

Next, with reference to FIG. 12, a process of moving back the opponent character 62 from the original position thereof in the virtual space (game image) of the own apparatus, will be specifically described. First, a position (original movement destination position) 62-2 of the movement destination of the opponent character 62 is calculated from a movement direction 70 of the ball 50 hit by the own character 61 and a position (original current position) 62-1 of the opponent character 62. Then, an original movement path 70-1 from the position 62-1 toward the position 62-2 is calculated. The original movement path 70-1 is a movement path of a case where position adjustment of the opponent character 62 is not performed. In this game processing, the own character 61 and the opponent character 62 are each automatically moved to a position for hitting a shot.

Then, on the basis of the RTT at the time point at which the own character 61 has hit a shot, a moving-back distance (which may be referred to as an "adjustment distance") of the opponent character 62 is determined (see FIG. 11). Then, as shown in FIG. 12, the position 62-1, the position 62-2, and the original movement path 70-1 are moved by the determined moving-back distance in the advancement direction (the movement direction 70) of the ball 50, without changing the positional relationship between each other. Accordingly, a position (target current position) 62-3, a position (target movement destination position) 62-4, and a target movement path 70-2 are calculated. Then, an adjustment movement path 70-3 that approaches the target movement path 70-2 from the original movement path 70-1 at a constant rate in accordance with the lapse of time is calculated, and the movement direction and the movement speed of the opponent character 62 are adjusted such that the opponent character 62 moves along the adjustment movement path 70-3 in the virtual space (game image) of the own apparatus. It should be noted that the opponent character 62 does not hit back a shot at a position rearward (rearward viewed along the Z-axis) of the position at which the ball 50 shot by the own character 61 bounces for the second time. Therefore, the position to which the opponent character 62 is moved back according to the determination of the above moving-back distance is up to the position of the above-described second bounce at maximum (the position of the second bounce in terms of a position viewed along the Z-axis). That is, the above moving-back distance is determined in a range in which the opponent character 62 is not moved back beyond the above second bounce position.

Here, the adjustment movement path 70-3 may be calculated by a process different from the above-described process, and the movement direction and the movement speed of the opponent character 62 may be adjusted such that the opponent character 62 moves along the adjustment movement path 70-3 in the virtual space (game image) of the own apparatus. In the following, specific description is given with reference to FIG. 12. First, similar to the above-described process, the position (original movement destination position) 62-2 of the movement destination of the opponent character 62 is calculated from the movement direction 70 of the ball 50 hit by the own character 61 and the position (original current position) 62-1 of the opponent character 62. Then, the position (target movement destination position) 62-4 is calculated, as the position to which the position 62-2 has been moved in the advancement direction (the movement direction 70) of the ball 50 by a moving-back distance (see FIG. 11) of the opponent character 62 determined on the basis of the RTT at the time point at which the own character 61 has hit a shot. Then, the adjustment movement path 70-3 along which the opponent character 62 moves from the position 62-1 toward the position 62-4 is calculated, and the movement direction and the movement speed of the opponent character 62 are adjusted such that the opponent character 62 moves along the adjustment movement path 70-3.

Therefore, according to this game processing, even when the RTT has been prolonged to some extent, unnatural display (see FIG. 4) in which the opponent character 62, which should not have been able to hit back the shot, hits back the shot can be prevented from being performed in the virtual space (game image) of the own apparatus.

In this game processing, in the virtual space (game image) of the own apparatus, movement control is performed such that, during a period in which the opponent character 62 has hit back a shot until the own character 61 hits back the shot, the position of the opponent character 62 adjusted through the above-described process gradually returns to the original position.

[Details Of Information Processing Of The Exemplary Embodiment]

Next, with reference to FIG. 13 to FIG. 16, information processing of the exemplary embodiment will be described in detail.

[Data To Be Used]

Figure 13:
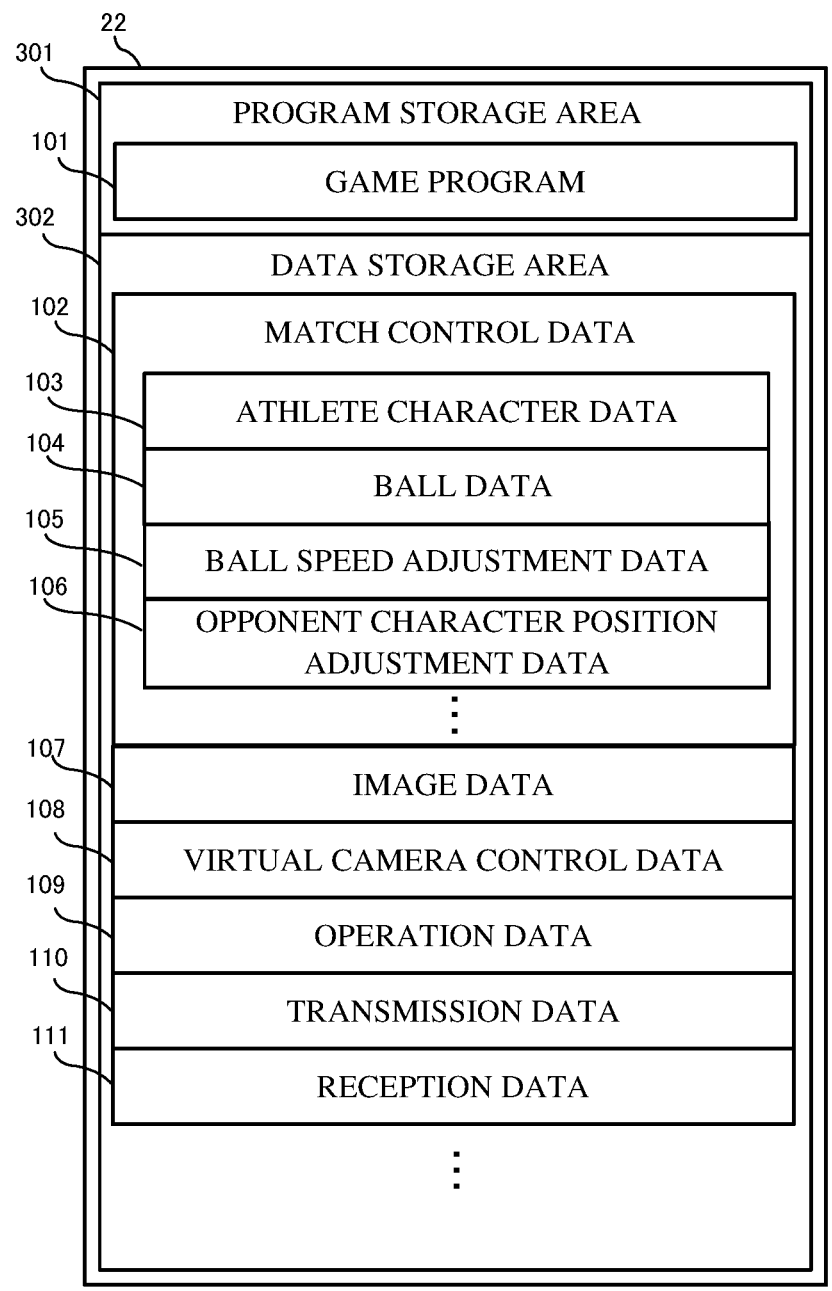
FIG. 13 shows a non-limiting example of various types of data stored in a storage section 22.

Various types of data to be used in this game processing will be described. FIG. 13 shows an example of a program and data stored in the storage section 22 of the game apparatus 2. As shown in FIG. 13, the storage section 22 is provided with at least a program storage area 301 and a data storage area 302. A game program 101 is stored in the program storage area 301. Match control data 102, image data 107, virtual camera control data 108, operation data 109, transmission data 110, reception data 111, and the like are stored in the data storage area 302. The match control data 102 includes athlete character data 103, ball data 104, ball speed adjustment data 105, opponent character position adjustment data 106, and the like.

The game program 101 is a game program for executing this game processing.

The athlete character data 103 is data regarding athlete characters. The athlete character data 103 includes various types of data for controlling motions of athlete characters during a match, such as the current positions and attitudes, the current motion states, and the like of the own character 61 and the opponent character 62.

The ball data 104 is data regarding the ball 50. The ball data 104 includes various types of data for controlling the motion of the ball, such as the position, movement direction, movement speed, and the like of the ball 50.

The ball speed adjustment data 105 is data for performing the movement speed adjustment (the movement speed adjustment of the ball 50 in the virtual space of the own apparatus) of the ball 50 described with reference to FIG. 5, FIG. 8, FIG. 10, and the like.

The opponent character position adjustment data 106 is data for performing the position adjustment (the position adjustment of the opponent character 62 in the virtual space of the own apparatus) of the opponent character 62 described with reference to FIG. 11 and FIG. 12.

The image data 107 is image data of athlete characters, a ball, a tennis court, and the like.

The virtual camera control data 108 is data for controlling movement of a virtual camera disposed in the virtual space. Specifically, the virtual camera control data 108 is data that designates the position/attitude, angle of view, imaging direction, and the like of the virtual camera.

The operation data 109 is data indicating the content of an operation performed on the controller 4. For example, data that indicates the press state with respect to the button section 43 and the input state with respect to the analog stick 42 is included. The content of the operation data is updated in a predetermined cycle on the basis of a signal from the controller 4 (the communication section 41).

The transmission data 110 is data to be transmitted to another game apparatus, and is data including at least information for identifying the transmission source and the content of the operation data 109.

The reception data 111 is data stored such that transmission data received from other game apparatuses (i.e., transmission sources) can be discerned for each of the other game apparatuses.

Other than the above, various types of data to be used in the game processing are stored as necessary in the storage section. For example, modeling data showing the appearances of athlete characters, spectators, and the like are stored.

[Details Of Game Processing]

Figure 14:
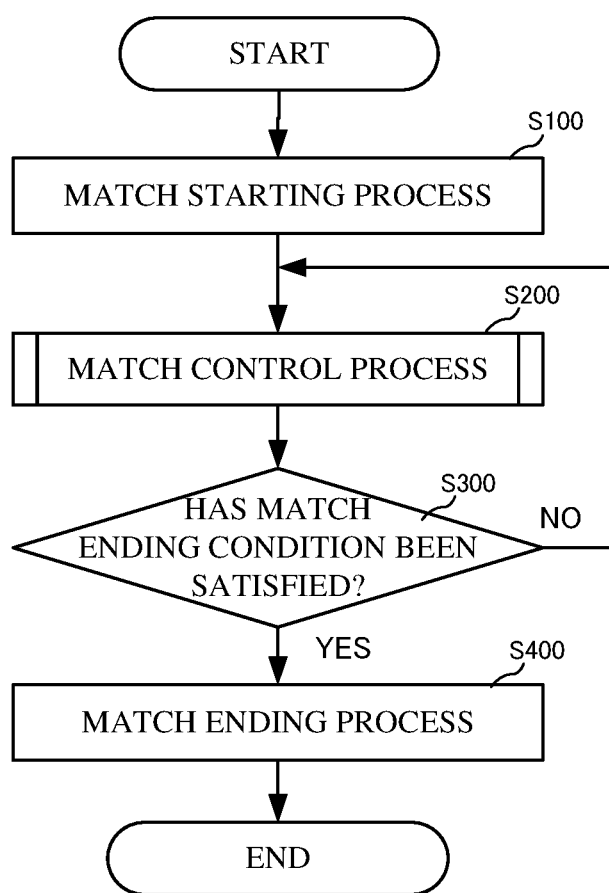
FIG. 14 is a non-limiting example of a flowchart of game processing.
Figure 15:
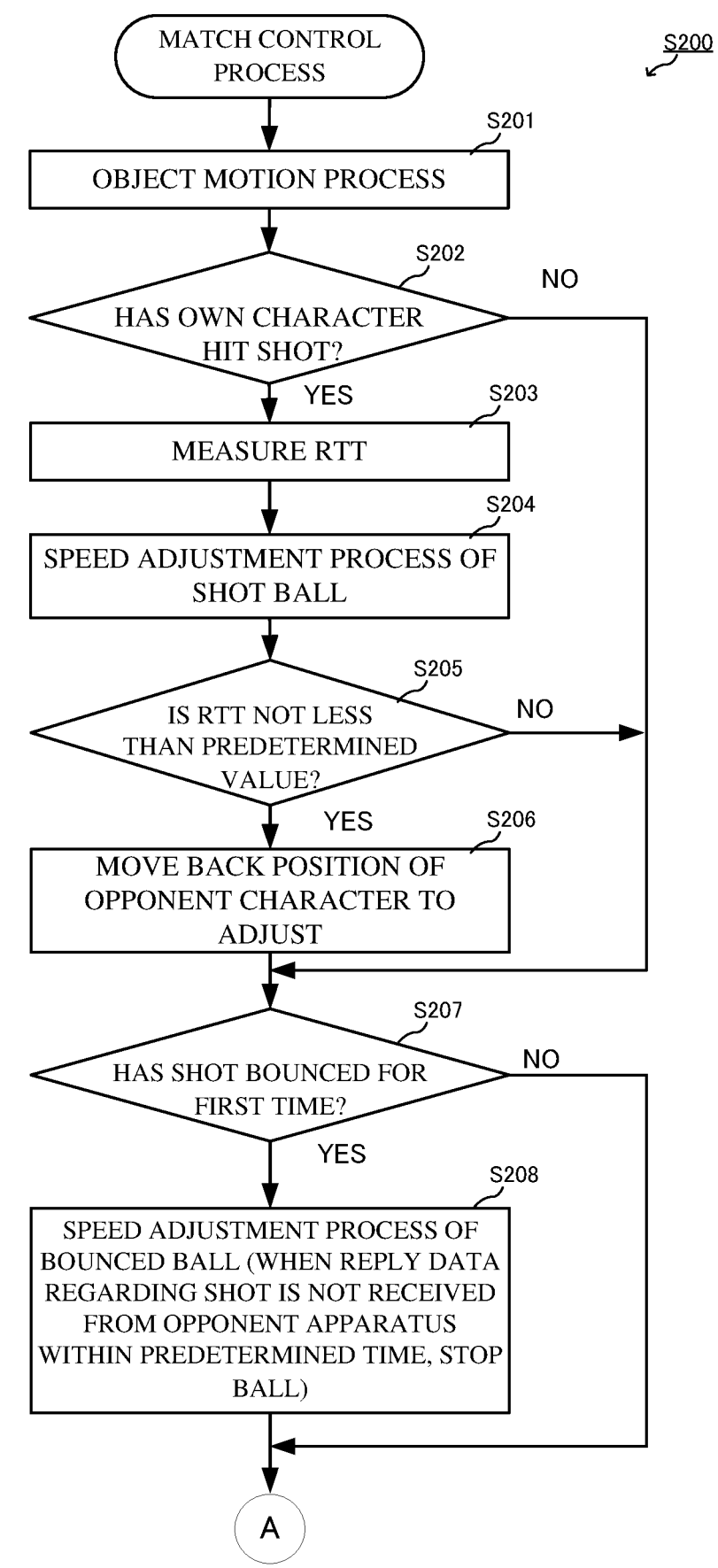
FIG. 15 is a non-limiting example of a flowchart of the game processing.
Figure 16:
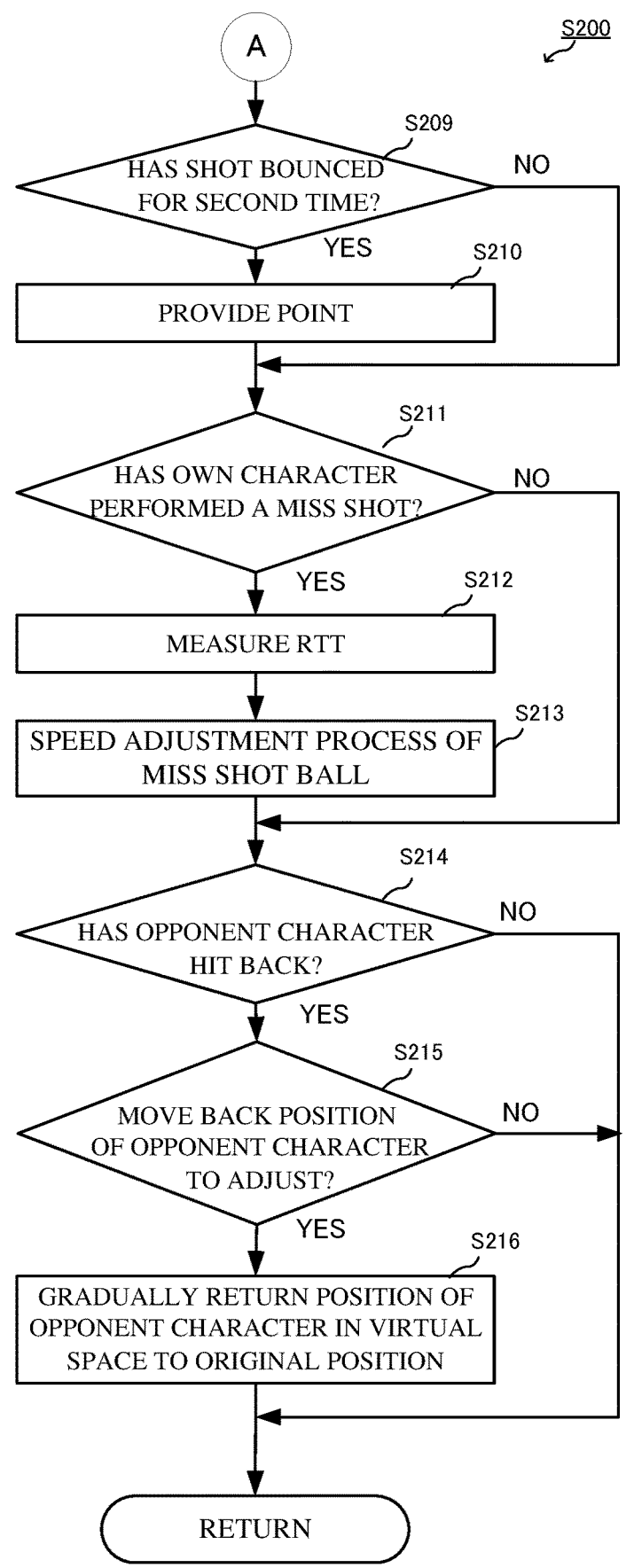
FIG. 16 is a non-limiting example of a flowchart of the game processing.

Next, with reference to a flowchart, details of the game processing according to the exemplary embodiment will be described. FIG. 14 to FIG. 16 are examples of a flowchart showing details of the game processing according to the exemplary embodiment.

First, upon start of this game processing, the processor 21 performs a match starting process in step S100 in FIG. 14. For example, the processor 21 displays, on the display section 5, a representation showing the start of a match. Then, the process proceeds to step S200.

In step S200, the processor 21 performs a match control process. FIG. 15 and FIG. 16 are an example of a flowchart showing the match control process. In the following, the match control process will be described with reference to FIG. 15 and the like. In the following, a typical process in this game processing will be described with reference to FIG. 15 and the like. During execution of the match control process and the like, acquisition of operation data, control of each object in the virtual space, display of an image, and the like are performed in each frame (i.e., at a predetermined time interval).

In step S201 in FIG. 15, the processor 21 performs an object motion process. For example, on the basis of the operation data 109, the processor 21 performs a control of causing the own character 61 to perform a motion of hitting a shot and of moving the ball 50 in accordance with the shot. For example, the processor 21 performs a control (automatic movement control) of automatically moving the own character 61 to a position at which the own character 61 is to hit back the shot hit by the opponent character 62. For example, the processor 21 transmits/receives data, to/from an opponent apparatus, that indicates the position, attitude, motion (e.g., an action of hitting a shot), and the like of an athlete character (the own character 61 or the opponent character 62) at a predetermined time interval (e.g., at a 10-millisecond interval), and synchronizes the position, attitude, action, and the like of the athlete character between the virtual space of the own apparatus and the virtual space of the opponent apparatus. In this manner, the processor 21 performs a process of causing the own character 61, the opponent character 62, the ball 50, and the like to perform motions in the virtual space of the own apparatus. Then, the process proceeds to step S202.

In step S202, the processor 21 determines whether or not the own character 61 has hit a shot, on the basis of the operation data 109 and the like. Specifically, the processor 21 determines whether or not a predetermined button has been operated at a shot success timing having already been described. When the determination in step S202 is YES, the process proceeds to step S203. When this determination is NO, the process proceeds to step S207.

In step S203, the processor 21 measures an RTT. Then, the process proceeds to step S204.

In step S204, on the basis of the ball data 104 and the ball speed adjustment data 105, the processor 21 performs a speed adjustment process of the ball 50 shot in the virtual space. Specifically, as described with reference to FIG. 5, the processor 21 reduces the movement speed of the shot ball 50 in the virtual space of the own apparatus, on the basis of the RTT measured in step S203, a speed reduction rate of the movement speed of the ball 50 determined on the basis of the RTT, and a reflection rate for reflecting the speed reduction rate on the movement speed of the ball 50. More specifically, the processor 21 multiplies the original movement speed (the movement speed before the speed adjustment) of the ball 50 by the above speed reduction rate, to calculate a final speed reduction amount. Then, the processor 21 multiplies the final speed reduction amount by the above reflection rate which gradually (smoothly) increases up to 100% in accordance with the lapse of time, thereby calculating the speed reduction amount according to the lapse of time of the shot ball 50. Then, the processor 21 subtracts the calculated speed reduction amount according to the lapse of time from the original movement speed of the shot ball 50, thereby performing adjustment of reducing the movement speed of the ball 50. Then, the process proceeds to step S205.

In step S205, the processor 21 determines whether or not the RTT measured in step S203 is not less than a predetermined value. When the determination in step S205 is YES, the process proceeds to step S206. When this determination is NO, the process proceeds to step S207.

In step S206, on the basis of the ball data 104, the athlete character data 103, and the opponent character position adjustment data 106, the processor 21 performs a process of adjusting the position of the opponent character in the virtual space so as to be moved back in the advancement direction (movement direction) of the ball 50. Specifically, as described with reference to FIG. 11 and FIG. 12, on the basis of the RTT measured in step S203, the movement direction 70 of the shot ball 50, and the original current position 62-1 of the opponent character 62, the processor 21 performs a control such that the opponent character 62 moves along the adjustment movement path 70-3 which is on the depth side relative to the original movement path 70-1 in the virtual space. Then, the process proceeds to step S207.

In step S207, the processor 21 determines whether or not the ball 50 shot by the own character 61 has bounced for the first time. When the determination in step S207 is YES, the process proceeds to step S208. When this determination is NO, the process proceeds to step S209 in FIG. 16.

In step S208, on the basis of the ball data 104 and the ball speed adjustment data 105, the processor 21 performs a speed adjustment process of the ball 50 having bounced for the first time in the virtual space. Specifically, as described with reference to FIG. 8, the processor 21 performs a process of reducing the movement speed of the ball 50 having bounced for the first time. It should be noted that, as described with reference to FIG. 8, when reply data (shot data or return failure data) with respect to the shot has not been received from the opponent apparatus within a predetermined time, the processor 21 performs a control of stopping the ball Then, the process proceeds to step S209 in FIG. 16.

In step S209 in FIG. 16, the processor 21 determines whether or not the ball 50 shot by the own character 61 has bounced for the second time. Specifically, on the basis of the reception data 111, the processor 21 determines whether or not data indicating that the ball 50 has bounced for the second time in the virtual space of the opponent apparatus has been received from the opponent apparatus. When the determination in step S209 is YES, the process proceeds to step S210. When this determination is NO, the process proceeds to step S211.

In step S210, the processor 21 performs a process of providing a point to the own character 61. Then, the process proceeds to step S211.

In step S211, on the basis of the operation data 109 and the like, the processor 21 determines whether or not the own character 61 has hit a miss shot. Specifically, as described with reference to FIG. 10, the processor 21 determines whether or not a predetermined button has been operated at a miss shot timing. When the determination in step S211 is YES, the process proceeds to step S212. When this determination is NO, the process proceeds to step S214.

In step S212, the processor 21 measures an RTT. Then, the process proceeds to step S213.

In step S213, on the basis of the ball data 104 and the ball speed adjustment data 105, the processor 21 performs a speed adjustment process of the ball 50 having been a miss shot in the virtual space. Specifically, as described with reference to FIG. 10, the processor 21 reduces the movement speed of the miss shot ball 50 in the virtual space of the own apparatus. As described with reference to FIG. 10, when reply data (shot data or return failure data) with respect to the miss shot has not been received from the opponent apparatus within a predetermined time, the processor 21 performs a control of stopping the ball 50. Then, the process proceeds to step S214.

In step S214, on the basis of the reception data 111, the processor 21 determines whether or not the opponent character 62 has hit back the shot hit by the own character 61. When the determination in step S214 is YES, the process proceeds to step S215. When this determination is NO, the process proceeds to step S300 in FIG. 14.

In step S215, the processor 21 determines whether or not the position of the opponent character 62 has been adjusted so as to be moved back through the process of step S206 in FIG. 15. When the determination in step S215 is YES, the process proceeds to step S216. When this determination is NO, the process proceeds to step S300 in FIG. 14.

In step S216, on the basis of the reception data 111, the processor 21 performs a control such that the opponent character 62 gradually (e.g., at a constant rate) moves toward the original position (see the position 62-2 in FIG. 12, for example) of the opponent character 62 in the virtual space. Specifically, in the virtual space of the own apparatus, the processor 21 gradually (smoothly) moves the opponent character 62 such that the position of the opponent character 62 matches the position (current position) of the opponent character 62 received from the opponent apparatus. Then, the process proceeds to step S300 in FIG. 14.

In step S300 in FIG. 14, the processor 21 determines whether or not a match ending condition that, for example, the own character 61 or the opponent character 62 has obtained a point for ending the match has been satisfied. When this determination is YES, the process proceeds to step S400. When this determination is NO, the process returns to step S200.

In step S400, the processor 21 performs a match ending process such as displaying, on the display section 5, a representation indicating the end of the match. Then, this game processing ends.

As described above, according to the exemplary embodiment, as described with reference to FIG. 4 to FIG. 6, etc., in the virtual space (game image) of the own apparatus, the movement speed of the shot ball 50 is reduced to some extent immediately after the shot in accordance with a reflection rate, then, is gradually (smoothly) reduced, and eventually becomes a movement speed indicated by the speed reduction rate (see (3) of FIG. 5). That is, in the virtual space (game image) of the own apparatus, (after the speed has been reduced to some extent immediately after the shot), the movement speed of the shot ball 50 is not reduced to a great extent at first, and then is gradually reduced more in accordance with the lapse of time. Therefore, according to the exemplary embodiment, while display of an unnatural game image (see FIG. 4) due to communication delay (RTT) is prevented from being performed, a refreshing feeling of the user at the time when the own character 61 has hit a shot can be ensured. The above-described speed reduction to some extent immediately after the shot need not necessarily be performed.

Figure 7:
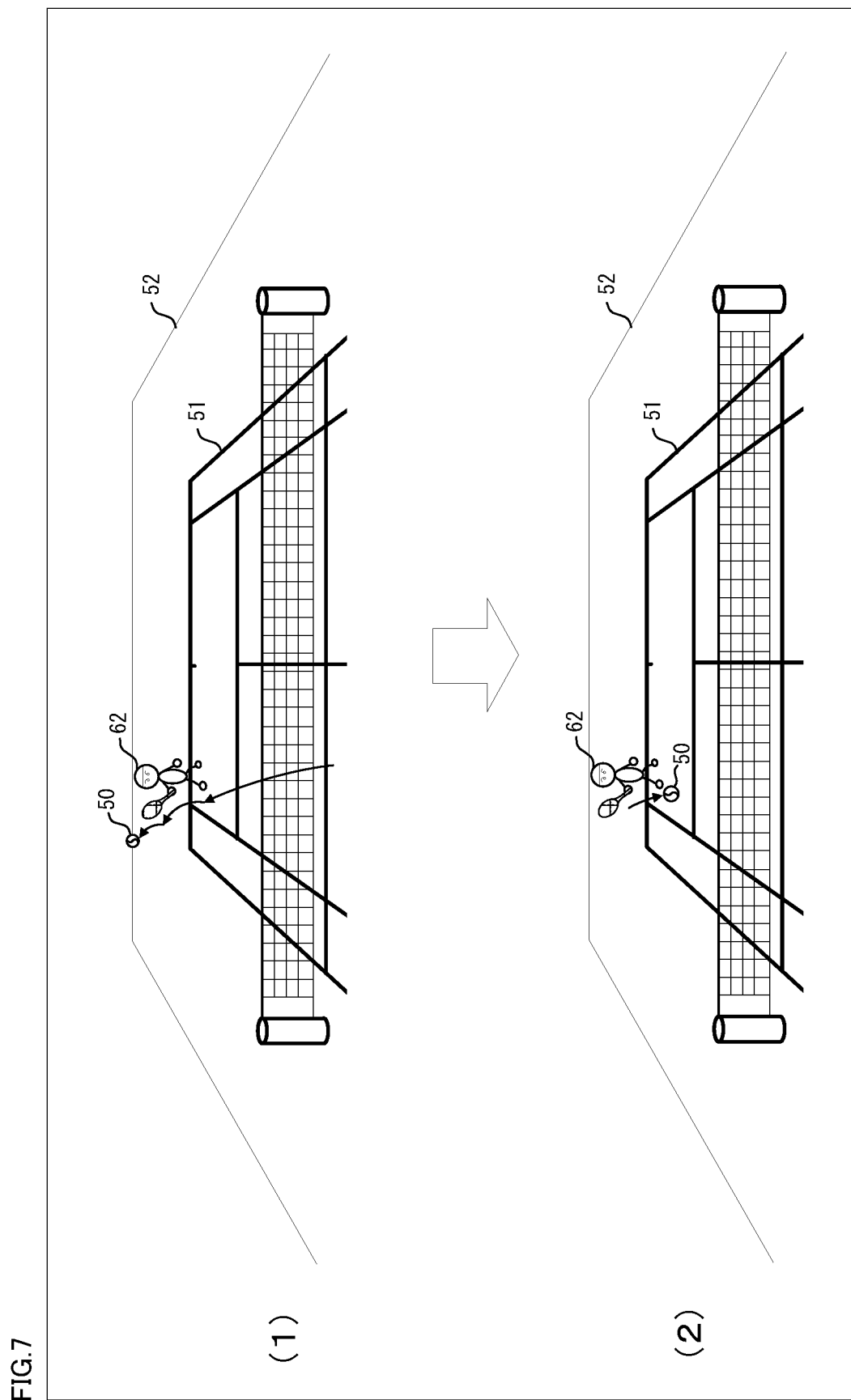
FIG. 7 is a diagram for describing a non-limiting example of a tennis game image.

As described above, according to the exemplary embodiment, as described with reference to FIG. 7 to FIG. 9, etc., in the virtual space (game image) of the own apparatus, the speed of the shot ball 50 is gently reduced after the first bounce and then rapidly reduced, and when it takes too much time (i.e., when a predetermined time has elapsed) before receiving shot data or return failure data from the opponent apparatus, the ball 50 is stopped (see FIG. 8). Then, when the opponent character 62 has hit back the shot, display of the opponent character 62 hitting back the shot is performed in the virtual space (game image) of the own apparatus (see (2) of FIG. 9). Thus, according to the exemplary embodiment, unnatural display (giving a strange feeling) can be prevented from being performed (see FIG. 7, FIG. 9).

As described above, according to the exemplary embodiment, as described with reference to FIG. 10, etc., in the virtual space (game image) of the own apparatus, when the own character 61 has hit a miss shot, the movement speed of the miss shot is adjusted so as to be reduced, for example, whereby the miss shot state is continued for a long time. Therefore, according to the exemplary embodiment, enough time until receiving data indicating that the opponent character 62 has hit a smash can be ensured, and unnatural display (giving a strange feeling) in which, although the miss shot state has been eliminated, the opponent character 62 hits back a smash, can be prevented from being performed.

As described above, according to the exemplary embodiment, as described with reference to FIG. 11, FIG. 12, etc., in the virtual space (game image) of the own apparatus, when the own character 61 has hit a shot, a process of shifting the position of the opponent character 62 in the advancement direction of the ball 50 is performed. Therefore, according to the exemplary embodiment, even when the communication delay (RTT) has been prolonged to some extent, unnatural display (giving a strange feeling) (see FIG. 4) in which the opponent character 62, which should not have been able to hit back the shot, hits back the shot can be prevented from being performed in the virtual space (game image) of the own apparatus.

[Modifications]

In the exemplary embodiment described above, a tennis game has been described as an example. However, not limited thereto, the exemplary embodiment can be applied to a table-tennis game or the like.

In the exemplary embodiment described above, when the own character 61 has hit a shot, a hit-stop in which the ball 50 shot in the virtual space of the own apparatus is stopped for a predetermined time may be performed. For example, a hit-stop in which the ball 50 is stopped for a predetermined time (e.g., 0.5 seconds) from T1 in (1) of FIG. 3 may be performed. Accordingly, even when the communication delay (RTT) is long, unnatural display described with reference to FIG. 4, etc., can be prevented from being performed in a more assured manner.

In the exemplary embodiment described above, as described with reference to FIG. 12, when the own character 61 has hit a shot, the opponent character 62 is moved in the advancement direction of the ball 50. However, when the own character 61 has hit a shot, the opponent character 62 may be moved in the Z-axis direction (see FIG. 12). In this case, in FIG. 12, the position (target current position) 62-3, the position (target movement destination position) 62-4, and the target movement path 70-2 will be at positions moved (parallel movement) in the Z-axis direction with respect to the position 62-1 (original current position), the position 62-2 (original movement destination position), and the original movement path 70-1, respectively.

In the exemplary embodiment described above, as described with reference to FIG. 12, the own apparatus calculates the position (original movement destination position) 62-2 of the movement destination of the opponent character 62. However, a configuration in which the opponent apparatus calculates the position (original movement destination position) 62-2 of the movement destination of the opponent character 62 may be adopted. In this case, toward the position (original movement destination position) 62-2 of the movement destination calculated by the opponent apparatus, a movement process of the opponent character 62 is performed for each frame in the opponent apparatus (the virtual space of the opponent apparatus). Then, the position of the opponent character 62 moved through the above-described movement process for each frame is sequentially transmitted from the opponent apparatus to the own apparatus. Then, with respect to the above-described position of the opponent character 62 sequentially received from the opponent apparatus, the own apparatus performs the position adjustment process (the process of gradually shifting the opponent character 62 in the advancement direction of the ball 50), described with reference to FIG. 12.

In the exemplary embodiment described above, with respect to the miss shot described with reference to FIG. 10, the speed adjustment described with reference to FIG. 5 need not necessarily be performed, and the speed adjustment described with reference to FIG. 8 need not necessarily be performed.

In the exemplary embodiment described above, a speed reduction rate is determined in accordance with the RTT (see (1) of FIG. 5), and a target speed (see (3) of FIG. 5) to which the speed of the ball 50 is reduced is determined by use of the determined speed reduction rate, whereby the speed of the ball 50 is reduced so as to attain the target speed. However, a speed reduction amount (an amount by which the movement speed of the ball 50 is decreased) may be determined in accordance with the RTT, and a target speed (see (3) of FIG. 5) to which the speed of the ball 50 is reduced may be determined by use of the determined speed reduction amount, whereby the speed of the ball 50 may be reduced so as to attain the target speed.

In the exemplary embodiment described above, a case where the series of processes related to the game processing are performed in a single game apparatus 2 has been described. However, in another exemplary embodiment, the series of processes above may be performed in an information processing system that includes a plurality of information processing apparatuses. For example, in an information processing system that includes a terminal side apparatus and a server side apparatus capable of communicating with the terminal side apparatus via a network, a part of the series of processes above may be performed by the server side apparatus. Alternatively, in an information processing system that includes a terminal side apparatus and a server side apparatus capable of communicating with the terminal side apparatus via a network, a main process of the series of processes above may be performed by the server side apparatus, and a part of the series of the processes may be performed by the terminal side apparatus. Still alternatively, in the information processing system above, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various types of game processing and stream the execution results as video/audio to the game apparatus 2.

While the exemplary embodiment has been described in detail, the foregoing description is in all aspects illustrative and not restrictive. It is to be understood that numerous other modifications and variations can be devised without departing from the scope of the exemplary embodiment.

What is claimed is:

1. A computer-readable non-transitory storage medium having stored therein instructions that, when executed by a processor of a first information processing apparatus, cause the first information processing apparatus to perform operations comprising:

transmitting/receiving data to/from a second information processing apparatus;

arranging, in a virtual space, an own character object corresponding to a first user of the first information processing apparatus, an opponent character object corresponding to a second user of the second information processing apparatus, and a movement object;

moving the movement object when a positional relationship condition regarding at least a positional relationship between the own character object and the movement object is satisfied;

reducing a movement speed of the movement object on the basis of a first reduction value calculated on the basis of a delay time in communication, of the data, with the second information processing apparatus;

adjusting the first reduction value such that the movement speed of the movement object is reduced in accordance with a time having elapsed from start of movement of the movement object; and causing the opponent character object to perform an action on the movement object, on the basis of data received from the second information processing apparatus.

2. The storage medium according to according to claim 1, wherein
the operations includes
reducing the movement speed of the movement object such that an amount of reduction of the movement speed of the movement object is increased in accordance with increase in the delay time.

3. The storage medium according to according to claim 1, wherein
the operations includes
moving the movement object in an order of a first movement path and a second movement path; and
reducing the movement speed of the movement object moving along the second movement path, in accordance with a time having elapsed from start of movement of the movement object along the second movement path.

4. The storage medium according to according to claim 3, wherein
the operations includes
reducing the movement speed of the movement object such that the movement speed decreases at the second movement path in accordance with a lapse of time and the movement object stops at a predetermined position on the second movement path.

5. The storage medium according to claim 3, wherein the operations further includes
providing, when data indicating that the movement object has ended moving along the second movement path in the virtual space of the second information processing apparatus has been received from the second information processing apparatus, a point in the game to the first user of the first information processing apparatus.

6. The storage medium according to claim 1, wherein the operations further includes
reducing, when an operation input of the first user satisfies a disadvantage condition, the movement speed of the movement object on the basis of a second reduction value; and
adjusting, when the movement object has been moved on the basis of a movement speed having been reduced on the basis of the second reduction value, the second reduction value such that the movement speed is further reduced at a predetermined timing.

7. The storage medium according to claim 1, wherein the operations includes
adjusting the first reduction value by increasing a reflection rate of the first reduction value in accordance with a time having elapsed from start of movement of the movement object, to reduce the movement speed of the movement object.

8. An information processing system of a first information processing apparatus, the information processing system comprising a processor and a memory coupled thereto, the processor being configured to control the information processing system to at least:

transmit/receive data to/from a second information processing apparatus;

arrange, in a virtual space, an own character object corresponding to a first user of the first information processing apparatus, an opponent character object corresponding to a second user of the second information processing apparatus, and a movement object;

move the movement object when a positional relationship condition regarding at least a positional relationship between the own character object and the movement object is satisfied;

reduce a movement speed of the movement object on the basis of a reduction value calculated on the basis of a delay time in communication, of the data, with the second information processing apparatus;

adjust the reduction value such that the movement speed of the movement object is reduced in accordance with a time having elapsed from start of movement of the movement object; and cause the opponent character object to perform an action on the movement object, on the basis of data received from the second information processing apparatus.

9. The information processing system according to claim 8, wherein
the movement speed of the movement object is reduced such that an amount of reduction of the movement speed of the movement object is increased in accordance with increase in the delay time.

10. The information processing system according to claim 8, wherein
the movement object is moved in an order of a first movement path and a second movement path, and
the movement speed of the movement object moving along the second movement path is reduced in accordance with a time having elapsed from start of movement of the movement object along the second movement path is performed.

11. The information processing system according to claim 10, wherein
the movement speed of the movement object is reduced such that the movement speed decreases at the second movement path in accordance with a lapse of time and the movement object stops at a predetermined position on the second movement path.

12. The information processing system according to claim 10, wherein
when data indicating that the movement object has ended moving along the second movement path in the virtual space of the second information processing apparatus has been received from the second information processing apparatus, a point in the game is provided to the first user of the first information processing apparatus.

13. The information processing system according to claim 8, wherein
the reduction value is adjusted by increasing a reflection rate of the reduction value in accordance with a time having elapsed from start of movement of the movement object, to reduce the movement speed of the movement object.

14. A first information processing apparatus comprising
a processor and a memory coupled thereto, the processor being configured to control the first information processing apparatus to at least:

transmit/receive data to/from a second information processing apparatus;

arrange, in a virtual space, an own character object corresponding to a first user of the first information processing apparatus, an opponent character object corresponding to a second user of the second information processing apparatus, and a movement object;

move the movement object when a positional relationship condition regarding at least a positional relationship between the own character object and the movement object is satisfied;

reduce a movement speed of the movement object on the basis of a reduction value calculated on the basis of a delay time in communication, of the data, with the second information processing apparatus;

adjust the reduction value such that the movement speed of the movement object is reduced in accordance with a time having elapsed from start of movement of the movement object; and cause the opponent character object to perform an action on the movement object, on the basis of data received from the second information processing apparatus.

15. The first information processing apparatus according to claim 14, wherein the movement speed of the movement object is reduced such that an amount of reduction of the movement speed of the movement object is increased in accordance with increase in the delay time.

16. The first information processing apparatus according to claim 14, wherein the movement object is moved in an order of a first movement path and a second movement path, and the movement speed of the movement object moving along the second movement path is reduced in accordance with a time having elapsed from start of movement of the movement object along the second movement path is performed.

17. The first information processing apparatus according to claim 16, wherein the movement speed of the movement object is reduced such that the movement speed decreases at the second movement path in accordance with a lapse of time and the movement object stops at a predetermined position on the second movement path.

18. The first information processing apparatus according to claim 16, wherein when data indicating that the movement object has ended moving along the second movement path in the virtual space of the second information processing apparatus has been received from the second information processing apparatus, a point in the game is provided to the first user of the first information processing apparatus.

19. The first information processing apparatus according to claim 14, wherein the reduction value is adjusted by increasing a reflection rate of the reduction value in accordance with a time having elapsed from start of movement of the movement object, to reduce the movement speed of the movement object.

20. An information processing method executed by a processor configured to control a first information processing system, the information processing method causing the first information processing system to:

transmit/receive data to/from a second information processing apparatus;

arrange, in a virtual space, an own character object corresponding to a first user of a first information processing apparatus, an opponent character object corresponding to a second user of the second information processing apparatus, and a movement object;

move the movement object when a positional relationship condition regarding at least a positional relationship between the own character object and the movement object is satisfied;

reduce a movement speed of the movement object on the basis of a reduction value calculated on the basis of a delay time in communication, of the data, with the second information processing apparatus;

adjust the reduction value such that the movement speed of the movement object is reduced in accordance with a time having elapsed from start of movement of the movement object; and cause the opponent character object to perform an action on the movement object, on the basis of data received from the second information processing apparatus.

* * * * *